United States Patent [19]

Colasanti

[11] Patent Number: 5,568,961
[45] Date of Patent: Oct. 29, 1996

[54] TUBULAR SEAT FRAME

[75] Inventor: Arduino Colasanti, Eastpointe, Mich.

[73] Assignee: Findlay Industries, Troy, Mich.

[21] Appl. No.: 288,450

[22] Filed: Aug. 10, 1994

[51] Int. Cl.[6] .................................................. B60N 2/02
[52] U.S. Cl. ............................ 297/362.12; 297/452.2; 297/362.13; 297/354.1
[58] Field of Search .......................... 297/362.12, 354.1, 297/362.13, 452.18, 452.2, 463.1

[56] References Cited

U.S. PATENT DOCUMENTS

| | | | |
|---|---|---|---|
| 3,037,812 | 6/1962 | Monroe | 297/362.13 |
| 3,140,896 | 5/1963 | Babbs . | |
| 4,111,482 | 9/1978 | Jones . | |
| 4,291,914 | 9/1981 | Mizelle . | |
| 4,400,032 | 8/1983 | Depolo . | |
| 4,575,153 | 3/1986 | Aoki et al. | 297/452.2 |
| 4,632,452 | 12/1986 | Vogel . | |
| 4,707,010 | 11/1987 | Croft et al. . | |
| 4,709,963 | 12/1987 | Uecker et al. . | |
| 4,804,225 | 2/1989 | Fourrey et al. | 297/452.2 |
| 4,828,278 | 9/1989 | Nakao et al. . | |
| 4,919,486 | 4/1990 | Chinomi et al. . | |
| 4,993,778 | 2/1991 | Colin et al. . | |
| 5,050,932 | 9/1991 | Pipm et al. | 297/452.18 X |
| 5,104,189 | 4/1992 | Hanai et al. . | |
| 5,104,190 | 4/1992 | Siegrist | 297/354.1 X |
| 5,165,756 | 11/1992 | Baker et al. . | |

FOREIGN PATENT DOCUMENTS

| | | | |
|---|---|---|---|
| 2693889 | 1/1994 | France | 297/362.13 |

Primary Examiner—Laurie K. Cranmer
Attorney, Agent, or Firm—Dinnin & Dunn, P.C.

[57] ABSTRACT

The device is a tubular seat frame for use in a vehicle application. The seat frame including a generally U-shaped seat base frame connected to a bracket member and a generally U-shaped seat back frame pivotally connected to the seat base frame through the bracket member for variable positioning by means of an adjustment means attached to the lower end of the seat back frame. The bracket member provides an extra wall at the pivot point to further support and retain the seat back frame. The bracket member providing a design for a lightweight seat frame which reduces overall weight while at the same time retaining its strength integrity.

7 Claims, 2 Drawing Sheets

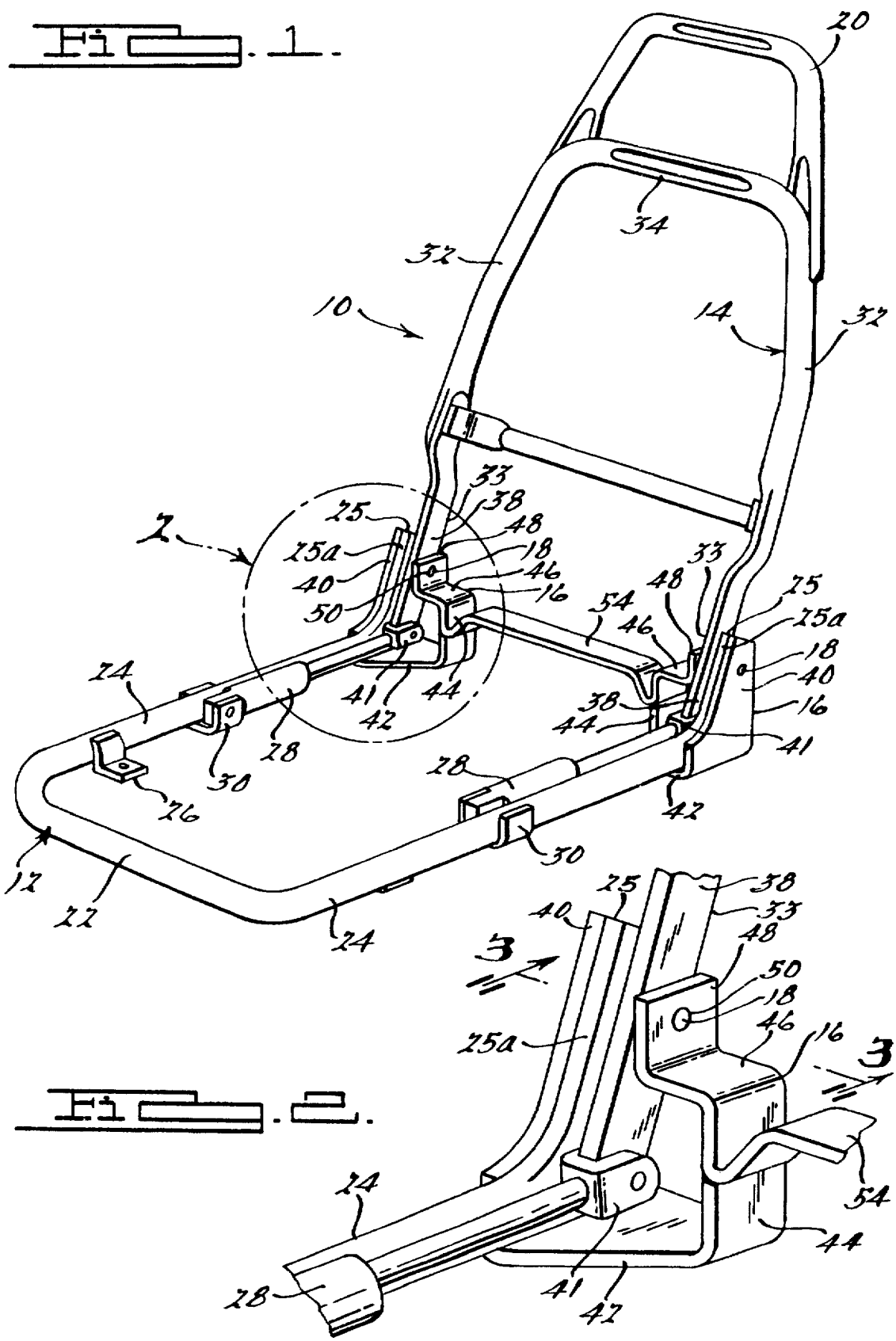

TUBULAR SEAT FRAME

BACKGROUND AND SUMMARY OF THE INVENTION

1. Background of the Invention

The present invention relates generally to a seat frame for use in an automotive vehicle, and more particularly, to the framework for pivotally mounting a seat back frame to a seat base frame.

2. Description of the Related Art

Conventional seating systems typically utilize a pivotal arrangement by which the position of the seat back in relation to the seat base may be varied. Such systems allow the seat back to be placed in discrete positions through either a mechanical apparatus or a power assist mechanism, typically, a screw, hydraulic or pneumatic assembly. Generally, automotive seat frames are of a tubular steel construction wherein the seat back is formed in a continuous U-shaped frame. The ends of the frame are flattened and pivotally connected at each end to a tubular seat base. While providing a satisfactory seat frame from an adjustability standpoint, such a frame fails to provide the necessary rigidity and strength to prevent torsion and flexing during use of the seat. It is known to provide reinforcing plates fastened along one, or both upright sides of the seat back frame to provide reinforcement against bending. While this approach aids in reducing the effects of torsional and bending loads and increases the capacity of the seat frame to accommodate bending and torsional loads, it also adds additional weight to the seat frame and therefore, increases manufacturing and assembly costs, along with increasing the overall weight of the vehicle.

While this approach has some limited uses, it is desired to have a lightweight seat frame which can accommodate bending and torsional loads, while being easily assembled to allow for pivotal adjustment between the seat cushion and seat back.

SUMMARY OF THE INVENTION

Accordingly, the present invention is a unique tubular seat frame for use in a vehicle application. In general, the seat frame includes a tubular seat base frame and a U-shaped seat back frame formed of a tubular construction pivotally connected to the seat base frame. The seat back frame is connected to the seat base frame via a bracket member. The bracket member includes two vertically extending side portions interconnected by a horizontal base portion. The seat base frame is attached to the bracket. The seat back frame is attached to, and pivots about a pivot pin extending between the vertical members.

One advantage of the present invention is that a substantially rigid tubular seat frame which resists torsional and bending stresses may be formed of lightweight materials. Such a construction reduces the overall weight of the seat frame while at the same time retaining strength integrity.

BRIEF DESCRIPTION OF THE DRAWINGS

FIG. 1 perspective view of the tubular seat frame of the present invention;

FIG. 2 is an enlarged view of the portion of the tubular seat frame of FIG. 1 shown in circle 2 of FIG. 1;

DETAILED DESCRIPTION OF THE PREFERRED EMBODIMENT(S)

Figure 3:
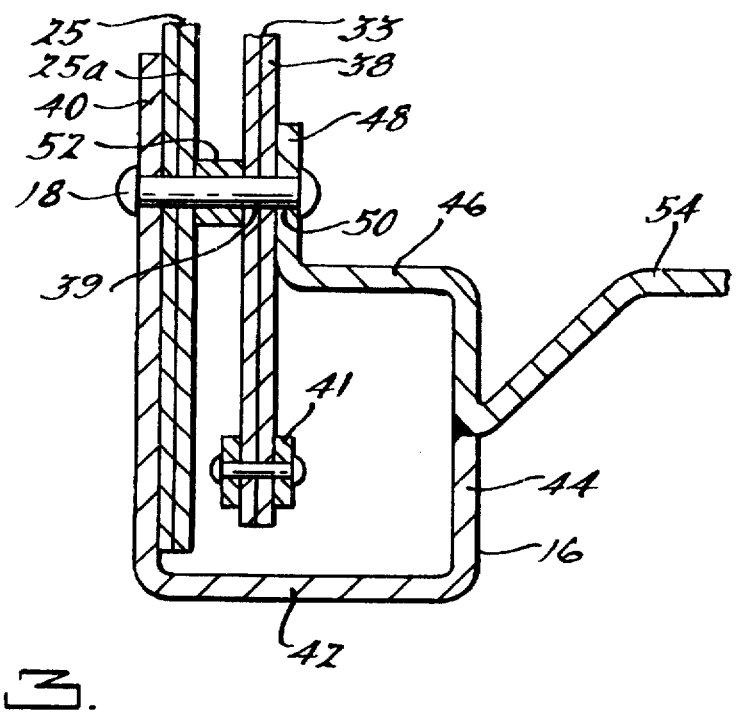
FIG. 3 is a sectional view taken along line 3—3 of FIG. 2.

Referring to the drawings, and more particularly to FIG. 1 thereof, a tubular seat frame, generally indicated at 10, is shown. The tubular seat frame 10 is formed of a seat base frame 12 and a seat back frame 14 pivotally connected through a bracket 16 via pivot pin 18. The tubular seat frame 10 further includes a substantially U-shape tubular head rest frame 20 attached by conventional means, such as welding to the seat back frame 14.

The seat base frame 12 is a substantially U-shaped tubular member having a front member 22 and corresponding side members 24. The end 25 of the side member 24 is compressed or flattened together to form a substantially flat plate-like member 25a, the sides of which are orientated substantially parallel to the longitudinal axis of the respective side members 24. The end 25 is curved in an upright manner. Pads 26 are attached to the side members 24 and are used to secure the seat base frame 12 to the vehicle base or floor pan (not shown). Adjustment means 28 for adjusting the position of the seat back frame 14 with respect to the seat base frame 12, are attached, through suitable attachment brackets 30, to the side members 24. The adjustment means 28 may be of any suitable electrical or mechanical type; e.g., screw and nut, pneumatic or hydraulic systems. The end 25 of the side member 24 is attached to an upright outer side wall 40 of the bracket 16. The bracket 16 further includes a base 42 transverse the outer side wall 40 and an inner side wall 44 including an inwardly extending section 46 and a second upright section 48. The second upright section 48 includes an aperture 50 through which the pivot pin 18 extends.

As shown more clearly in FIGS. 2 and 3, the end 25 of the side member 24 is mechanically connected to the outer upright side wall 40 of the bracket 16, through some type of permanent means, usually welding. Other fastening or connection means such as threadable fasteners or rivets can also be used.

The seat beck frame 14 is an inverted substantially U-shaped member which includes a transverse top portion 34 and upright side portions 32. A transverse brace 36 extends between the upright side portions 32 and provides additional stability and rigidity to the seat back frame 14. The end 33 of the upright side portion 32 is also flattened to form a substantially flat plate-like portion 38. The flat, plate-like portion 38 includes an aperture 39 defining a pivot point about which the seat back frame 14 rotates. As illustrated in FIG. 3, the end 33 of the upright side portion 32 extends downwardly, past the pivot pin 18, and forms a lever arm to which the adjustment means 28 is engaged via a yoke and pin assembly 41.

During assembly, the seat base frame 12 is welded to the outer upright side wall 40 of the bracket 16. The planar or flat, plate-like ends 33 of the upright side portions 32 are pivotally secured through aperture 39 about pivot pin 18 which extends between the outer side wall 40 and the second upright portion 48 of the inner side wall 44 of the bracket 16. A bushing 52, to provide proper alignment, is positioned between the end 25 of the side members 24 and the end 33 of the upright side portion 32 to form the entire tubular seat frame 10.

Further, as shown in FIG. 1, a cushion brace 54 extends between the brackets 16 to further support and provide rigidity to the seat frame 10.

It should be appreciated that a tubular seat frame 10, according to the present invention, may be manufactured from a lightweight material, such as a magnesium alloy, to reduce the overall weight of existing seat frames by 40 to 50 percent, while at the same time retaining strength and integrity.

Figure 4:
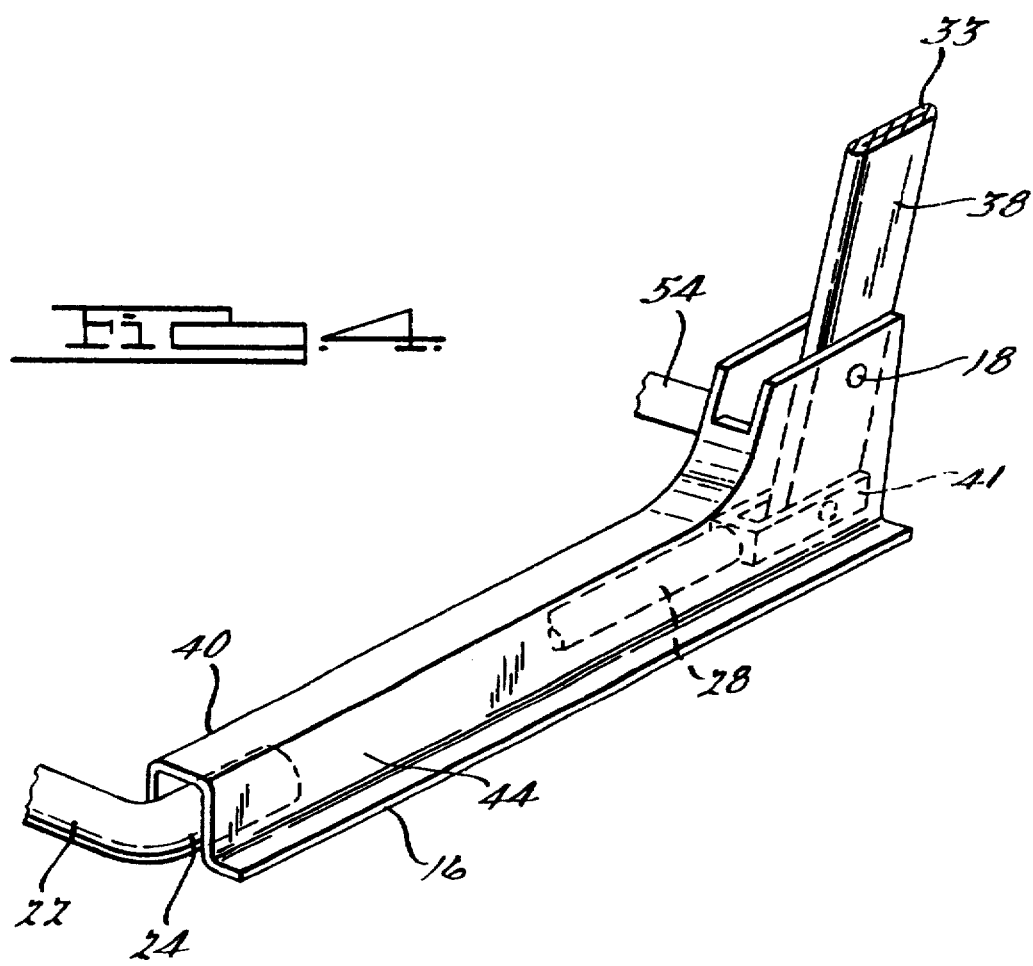
FIG. 4 is a first alternative embodiment of the tubular seat frame of FIG. 1.

Referring now to FIG. 4, a first alternative embodiment of the present invention is shown. The bracket 16 is formed in an elongated manner whereby the inner and outer side wall portions of the bracket are longitudinally extended and form the side members 24 of the seat base frame 12.

Utilizing the bracket 16 shown in FIG. 4 enables a reduction in the mount of tubular material used. The bracket 16 may be formed from various materials and through various methods such as stamping, extrusion or otherwise.

It should be appreciated that the invention set forth above reinforces the seat back frame 14 through the use of an extra wall section at the pivot pin 18. The invention provides a tubular seat frame 10 which is reinforced, while offering reduced weight and minimal fabrication time.

What is claimed is:

1. A seat frame comprising:
   a U-shaped base frame, said base frame having a from member and corresponding side members;
   U-shaped brackets, including an outer side wall and an inner side wall, connected to said U-shaped base frame;
   a U-shaped seat back frame including a transverse top portion and upright side portions, said upright side portions having ends, each of said ends flattened to form a plate-like member, said plate-like member having first and second apertures therein where said plate-like member is positioned between said outer side wall and inner side wall of said bracket;
   a pivot pin extending through said second aperture in said plate-like member on said seat back frame and secured to said bracket to pivotally connect said seat back frame to said bracket; and
   actuation mechanisms mounted adjacent said side members, said actuation mechanisms pivotally connected to said seat back frame via said first apertures wherein said actuation mechanisms operate to adjust the position of said seat back frame relative to said seat base frame.

2. A seat frame as set forth in claim 1 wherein a bushing is positioned between each of said plate-like members of said seat back frame and said outer side wall.

3. A seat frame as set forth in claim 1 wherein each of said inner side walls of said brackets includes an inwardly extending section and an upright section having a bore therein wherein said pivot pin extends through said bore.

4. A seat frame as set forth in claim 1, wherein a transverse brace extends between and connects said brackets.

5. A seat frame as set forth in claim 1 including a substantially U-shaped tubular headrest frame secured to the upright side portions of said seat back frame.

6. A seat frame as set forth in claim 1 wherein said plate-like member is sandwiched between said outer side wall and said inner side wall.

7. A seat frame as set forth in claim 1 wherein said U-shaped base frame, said brackets and said back frame are made of a magnesium alloy.

* * * * *

UNITED STATES PATENT AND TRADEMARK OFFICE
CERTIFICATE OF CORRECTION

PATENT NO. : 5,568,961
DATED : October 29, 1996
INVENTOR(S) : Arduino Colasanti

It is certified that error appears in the above-indentified patent and that said Letters Patent is hereby corrected as shown below:

Column 1, Line 62, after "Figure 1", insert --- is a ---.

Column 2, Line 48, delete "fiat" insert --- flat ---.

Column 3, Line 13, delete "mount" insert --- amount ---.

Column 3, Line 1, Claim 1, delete "from" insert --- front ---.

Column 4, Line 2, Claim 7, after "said" (2nd occur.) insert --seat --.

Signed and Sealed this

Twentieth Day of May, 1997

Attest:

BRUCE LEHMAN

Attesting Officer           Commissioner of Patents and Trademarks

UNITED STATES PATENT AND TRADEMARK OFFICE
CERTIFICATE OF CORRECTION

PATENT NO.   : 5,568,961
DATED        : October 29, 1996
INVENTOR(S)  : Colasanti It is certified that error appears in the above-identified patent and that said Letters Patent is hereby corrected as shown below:

On the title page, the Assignee should be -- Findlay Industries, Inc. --

Signed and Sealed this

Second Day of September, 1997

Attest:

BRUCE LEHMAN

Attesting Officer

Commissioner of Patents and Trademarks